(12) United States Patent
Rieder et al.

(10) Patent No.: US 7,550,727 B2
(45) Date of Patent: Jun. 23, 2009

(54) INFRARED (IR) RECEIVING DEVICE

(75) Inventors: Helmut Rieder, Graz (AT); Raimund Pammer, St. Josef (AT); Wolfgang Boh, Graz (AT); Andreas Schalk, Graz (AT)

(73) Assignee: Efkon AG, Graz (AT)

( * ) Notice: Subject to any disclaimer, the term of this patent is extended or adjusted under 35 U.S.C. 154(b) by 286 days.

(21) Appl. No.: 10/574,402

(22) PCT Filed: Sep. 30, 2004

(86) PCT No.: PCT/AT2004/000331

§ 371 (c)(1),
(2), (4) Date: Apr. 3, 2006

(87) PCT Pub. No.: WO2005/034392

PCT Pub. Date: Apr. 14, 2005

(65) Prior Publication Data

US 2007/0007452 A1    Jan. 11, 2007

(30) Foreign Application Priority Data

Oct. 8, 2003  (AT) ............................. A 1591/2003

(51) Int. Cl.
*G01J 5/02* (2006.01)
(52) U.S. Cl. .................. 250/339.02; 250/349
(58) Field of Classification Search ............. 250/349, 250/338.1, 339.11, 339.14, 341.8, 342, 339.02
See application file for complete search history.

(56) References Cited

U.S. PATENT DOCUMENTS

| | | | | |
|---|---|---|---|---|
| 3,495,086 A * | 2/1970 | Scott, Jr. ................. 250/206.2 |
| 5,731,621 A * | 3/1998 | Kosai ...................... 257/440 |
| 5,838,472 A | 11/1998 | Welch et al. |
| 6,486,994 B1 | 11/2002 | Giles |
| 6,567,200 B1 * | 5/2003 | Pammer et al. ............. 398/202 |
| 6,573,490 B2 * | 6/2003 | Hochstein .............. 250/227.25 |
| 6,593,698 B2 * | 7/2003 | Stam et al. ................... 315/82 |
| 6,707,497 B1 * | 3/2004 | Pantigny et al. ............. 348/310 |
| 2008/0251721 A1 * | 10/2008 | Ueno ........................ 250/332 |

FOREIGN PATENT DOCUMENTS

| | | |
|---|---|---|
| DE | 42 39 863 | 4/1993 |
| GB | 2 385 198 | 8/2003 |
| WO | 99/03218 | 1/1999 |
| WO | 00/42719 | 7/2000 |

OTHER PUBLICATIONS

Austrian Office Action with English Translation.

* cited by examiner

*Primary Examiner*—David P Porta
*Assistant Examiner*—David S Baker
(74) *Attorney, Agent, or Firm*—Collard & Roe, P.C.

(57) ABSTRACT

An infrared (IR) receiving device (1) with IR detector elements (3) for receiving IR signals from a communication zone (5), as well as with a processing circuit for deriving electric signals corresponding to the IR signals received, wherein the IR detector elements (3) are provided in at least one matrix-type arrangement (2) which corresponds to a matrix-type segmentation of the communication zone (5), and the processing circuit comprises a maximum detector circuit (9) connected to the IR detector elements (3), which maximum detector circuit (9) selects one respective maximum output signal from among the output signals of the IR detector elements (3) for deriving the electric signal.

10 Claims, 5 Drawing Sheets

INFRARED (IR) RECEIVING DEVICE

CROSS REFERENCE TO RELATED APPLICATIONS

Applicants claim priority under 35 U.S.C § 119 of Austrian Patent Application No. A 1591/2003 filed Oct. 8, 2003. Applicants also claim priority under 35 U.S.C. §365 of PCT/AT2004/000331 filed Sep. 30, 2004. The international application under PCT article 21(2) was not published in English.

The invention relates to an infrared (IR) receiving device comprising IR detector elements for receiving IR signals from a communication zone, as well as a processing circuit for deriving electric signals corresponding to the IR signals received.

Such an IR receiving device preferably is used in combination with systems for electronic tolling, e.g. when motor vehicles use freeways for which a toll must be paid. With such systems, it is important that a high degree of selectivity is ensured during the communication between vehicle-borne transmitting and receiving units, the so-called OBUs (on board units), and the stationary transmitting and receiving devices, enabling an IR communication exclusively between associated motor vehicles in the respective lanes and IR transmitting and receiving devices of the stationary installation. On the other hand, it is also desired that the IR signals can reliably be detected on the receiving side, and daylight, which is a strong background light, is a factor which renders this more difficult if IR signals are transmitted and received outdoors. By this, the respective transmission distance is limited in case of an optic communication. Here, quite generally it holds that the distance capable of being bridged, or the range, will depend on the radiation intensity at the location of the receiving device and on the sensitivity of the receiving elements. With a given radiation intensity, the sensitivity of the receiving elements, in particular photo diodes, can be increased to a limited extent only, the limiting value being determined by the aforementioned background light, in particular the sunshine prevailing outdoors. To increase the sensitivity of the receiving elements, a special circuit of the receiving elements has already been proposed in WO 99/03218 A so as to increase the signal/noise ratio. With this technology, however, a large number of stages is required if the sensitivity increase is to exceed a certain value. For instance, for increasing the sensitivity by a factor 10, one hundred times as many receiving elements will be required. This leads to an unproportional increase of the costs of such a receiving device so that it will no longer be economical. Moreover, large detector areas will also result in a loss of speed in the signal recovery.

Another approach consists in increasing the radiation intensity by means of convergent lenses provided on the receiving device. The optical amplification of the useful signal obtainable approximately corresponds to the ratio of active lens surface to active detector surface. Yet, the diffuse background light is not concentrated in a comparable manner on the detector surface. This can increase the sensitivity of the receiver quite substantially. However, what is disadvantageous in this respect is the given restriction of the field of observation, the so-called communication zone, wherein, for instance, only a small partial region of a lane remains as the communication zone. This often is undesired, or inadmissible, respectively.

The invention now has as an object to provide a receiving device as initially defined, in which the receiving sensitivity can be substantially increased by simple measures and without restricting the communication zone.

To achieve the objects defined according to the invention, the invention provides an IR receiving device of the initially defined type which is characterized in that the IR detector elements are provided in at least one matrix-type arrangement which corresponds to a matrix-type segmentation of the communication zone, and that the processing circuit comprises a maximum detector circuit connected to the IR detector elements, which maximum detector circuit selects one respective maximum output signal from among the output signals of the IR detector elements, for deriving the electric signal.

The invention is based on the finding that the receiving sensitivity can be substantially increased by a specific design and arrangement of the optical detector elements in combination with a specific circuitry adapted thereto. In the region of the optical detector elements just as in the electronic processing circuit, a 10-20-fold sensitivity can be attained without any problems with the simple technical measures mentioned, and which, on the other hand can be utilized to manage the optical communication over distances which are, e.g., four times as large, with the same transmitting and receiving elements. With the present technique, the communication zone to be watched is subdivided by means of the optical detector elements "tile-like" into small areas, e.g. segments. As the optic imaging elements, convergent lenses are, e.g., used which concentrate the optical useful signal including the background light to the respective IR detector element, i.e. in particular a photo diode. In doing so, the array of the IR detector elements is such that a signal from any desired site from the communication zone will always be detected by at least one of the IR detector elements. What is then of importance is that from among all the detector element signals, the one which has an instantaneous maximum amplitude as compared to all the other detector element signals is electronically chosen for further processing and evaluation thereof. Only this maximum signal will be supplied for an evaluation, whereas all the lower signals will be suppressed. In this way it is ensured that always the signal with the highest signal/noise ratio will be used for evaluation purposes. If, however, the mean of all the signals applied to the input were formed by the processing circuit, the useful signal would be comparatively attenuated. This makes sense, considering that, as a rule, the optical useful signal is applied only to one or a few of the receiving elements.

When the communication zone to be monitored or watched is apportioned to several detector elements (also called receiving elements), problems might possibly occur insofar as in conventional infrared receiving elements, such as photo diodes, there exist active area regions which do not extend over the entire upper side, resulting in dead zones when these detector elements are arranged immediately adjacent to each other. On the other hand, this means that the entire communication zone to be watched could not be imaged on the detector elements without any gaps therebetween so that—when vice versa, the projection of the detector elements on the communication zone is regarded—intermediate regions—namely dead zones—will exist there, from which no IR signal can be received. To remedy this situation, according to the invention it is particularly advantageously provided that at least two matrix-type IR detector element arrays are provided, the positions of the IR detector elements being offset relative to each other from array to array. Thus, there exist two matrix-type IR detector element arrays which are spatially separate from each other, the IR detector elements in the individual arrays being offset relative to each other, i.e. particularly by an amount of offset which corresponds to the size of the active zones or of the non-active intermediate zones, respectively. If with two such groups of IR detector elements in a matrix form, a receiving arrangement covering the entire area cannot yet be formed, also more than two, e.g. three, four or six, arrays can be provided. In this manner, an optionally even overlapping, in any case, an uninterrupted "tile" arrangement is achieved.

On the other hand, when respective IR detector elements having active surfaces covering their entire upper or front side are provided, it is advantageous if the IR detector elements are provided in a chessboard-type arrangement, with their active detector surfaces being substantially seamlessly arranged side by side. Therefore, in this embodiment a single group or array of IR detector elements will suffice.

For concentrating imaging of the communication zone to the (or the respective) IR detector element array, a (respective) imaging lens (convergent lens) is, for instance, arranged in front of the IR detector elements. In case of several groups of IR detector elements, one such imaging lens can image the observed communication zone on one group of IR detector elements, and a second lens can be provided for imaging the communication zone on a second group of IR detector elements, etc..

To recover the electric signal, i.e. in particular from corresponding electric pulses, it has also proven advantageous if a threshold-value-forming unit is connected to the IR detector elements whose output is connected to an input of a comparator at whose other input the respective maximum IR detector element output signal is applied. Thus, the respective instantaneous maximum value is applied to the comparator; from this maximum value, furthermore an appropriate threshold value is derived in parallel thereto, which threshold value also is applied to the comparator. A maximum or minimum value, respectively, of the threshold can be determined by a resistor network, and the threshold value can follow a rising flank of the applied signal up to the previously mentioned maximum value. When the threshold value decreases, the time of decrease is, e.g., determined by the time constant of an RC member belonging to the threshold-value-forming unit. In this way, a dynamic adaptation of the threshold to the respective signal can be achieved, whereby consequently an improved noise suppression is attained, and the output pulses of the comparator furthermore will have a uniform amplitude irrespective of the level of the receiving signal so that a data signal of excellent quality will be obtained which will be supplied for the respective evaluation, or decoding, respectively.

In detail, for designing the circuit, it has also proven suitable if each IR detector element, for selecting the maximum output signal, has at least one consecutive diode, the diodes, optionally in groups, being interconnected by their sides facing away from the IR detector elements, e.g. by their cathodes. By this, a maximum value selection can be realized in a particularly simple manner as regards the circuitry technique, it being furthermore advantageous here if the diodes, or the diodes of one group, respectively, are connected to a common resistor from which the respective maximum IR detector element output signal can be collected and supplied to the other input of the comparator. It is also suitable if the diodes, or the diodes of another group, respectively, are connected to the threshold-value-forming unit.

For applying a threshold value signal of a suitable level to the one input of the comparator, it is finally also suitable if the threshold-value-forming unit simply has a voltage divider from which the threshold voltage is supplied to the one input of the comparator.

In the following, the invention will be explained in more detail by way of preferred exemplary embodiments illustrated in the drawings to which, however, it shall not be restricted. In detail, in the drawings FIG. 1 schematically shows an arrangement (array) of IR receiving elements with an associated imaging lens for illustrating the segmentation of a communication zone symbolically indicated by a vehicle;

Figure 1:
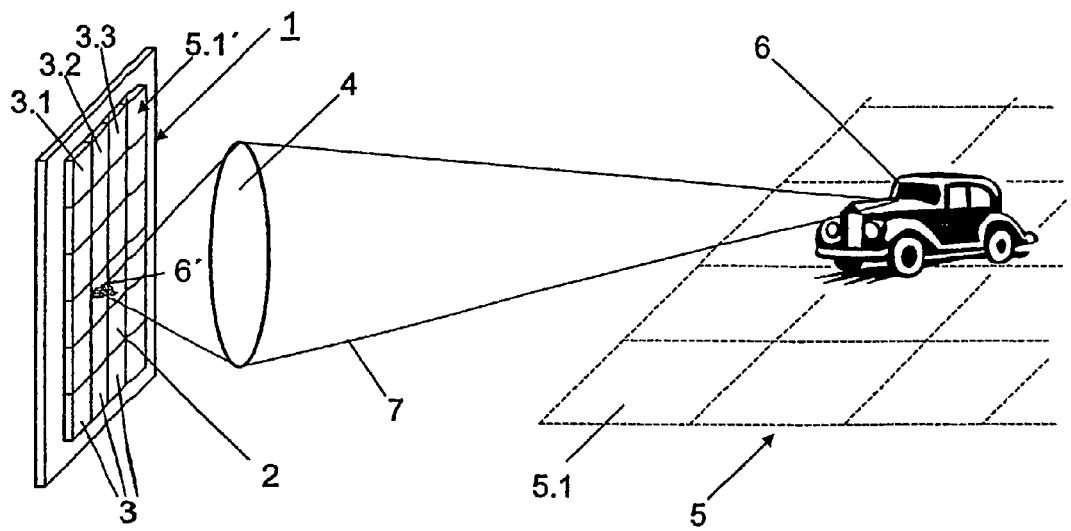
Figure 4:
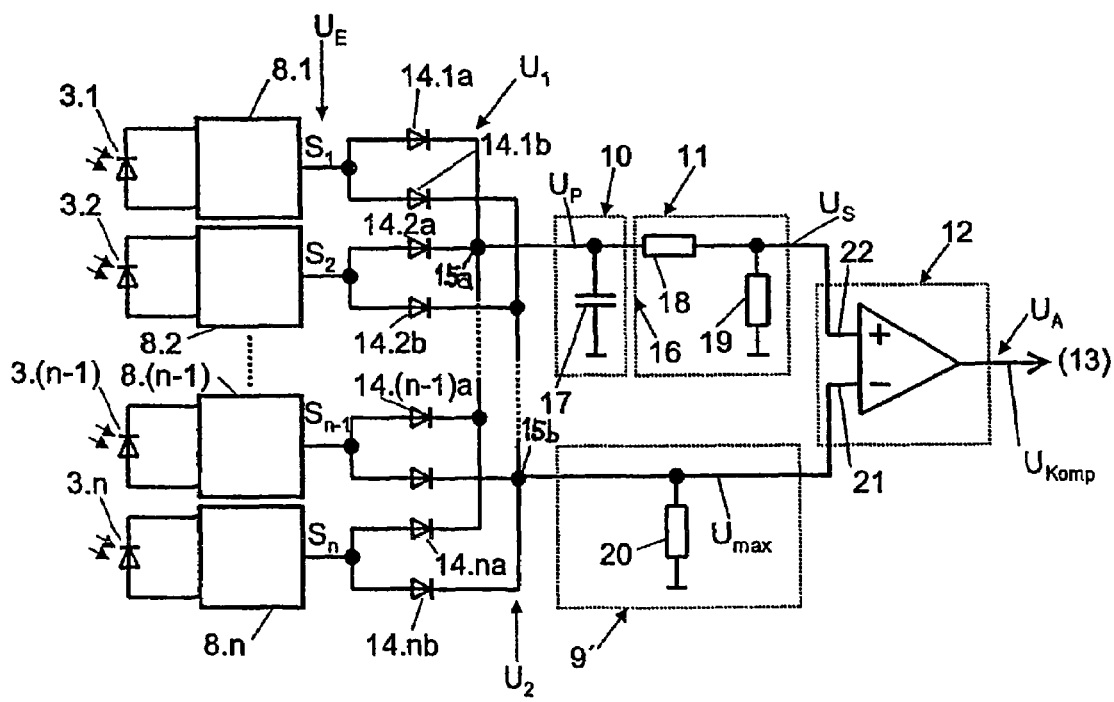
FIG. 4 shows an IR receiving device which is somewhat modified relative to that of FIG. 3, in a block diagram thereof.
Figure 5:
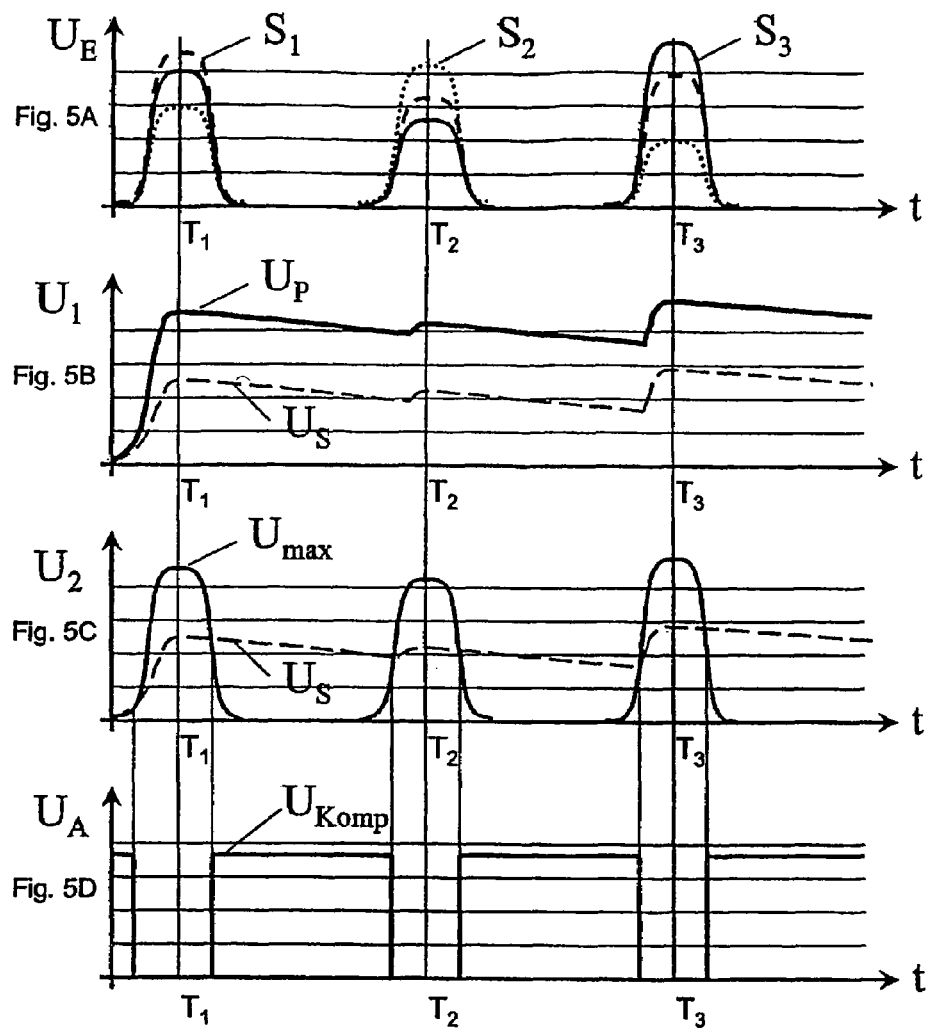
Figure 6:
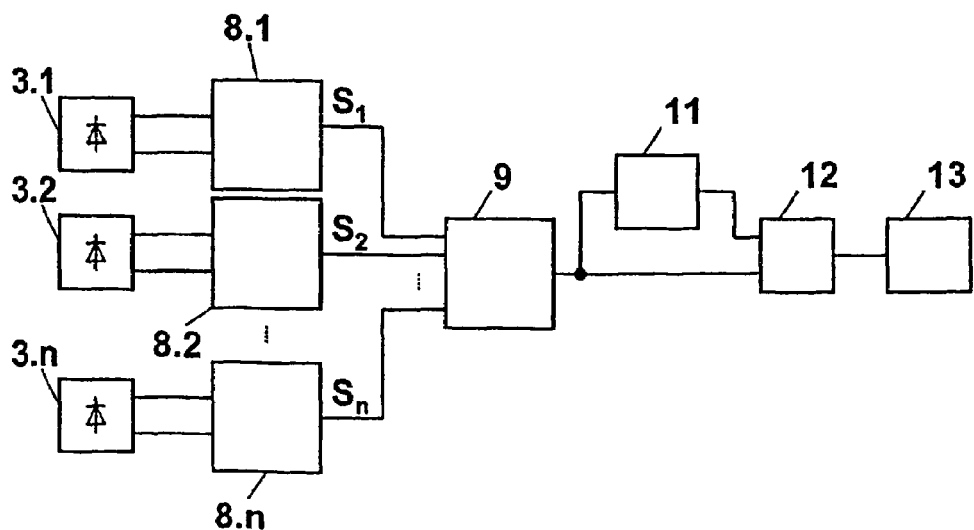
Figure 7:
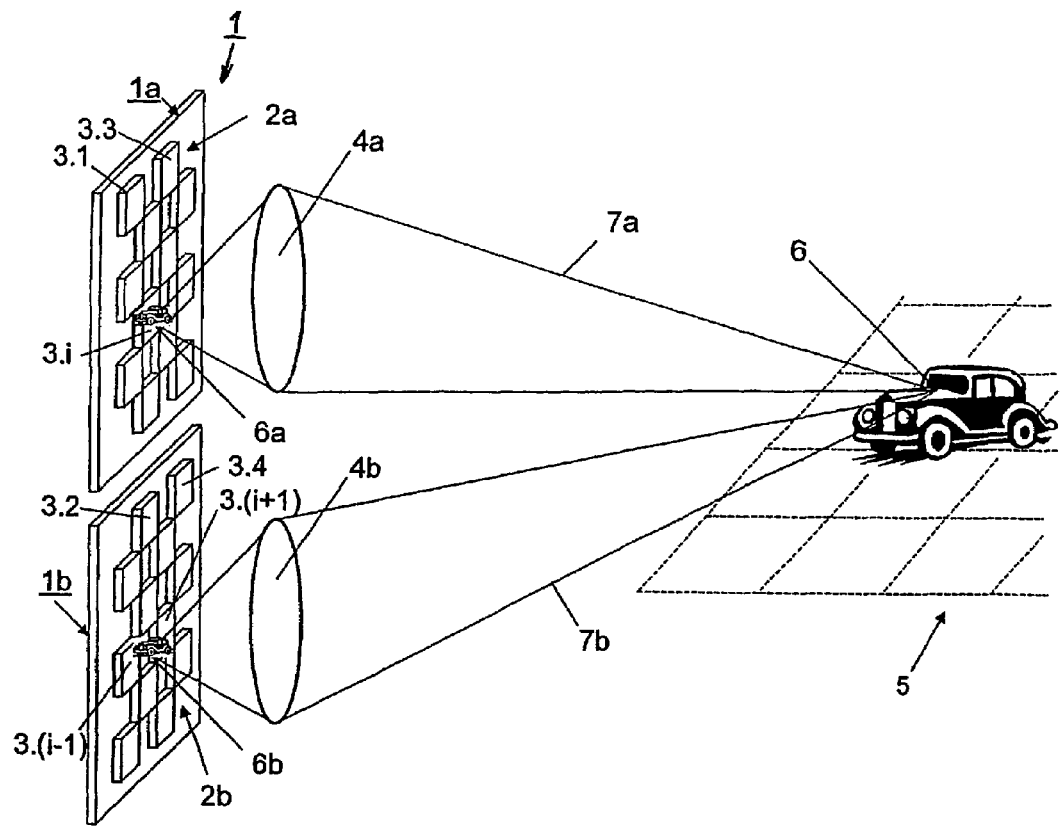
Figure 7A:
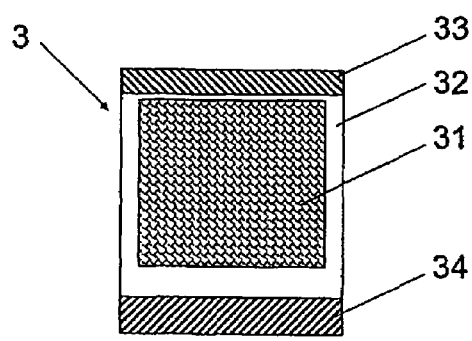
Figure 8:
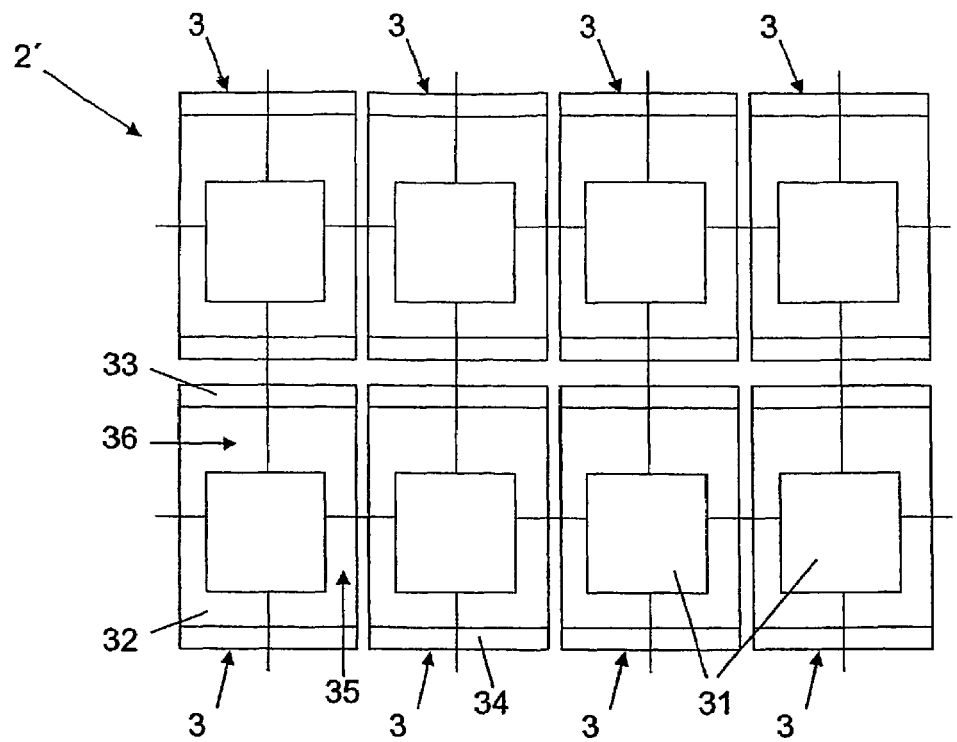
Figure 9:
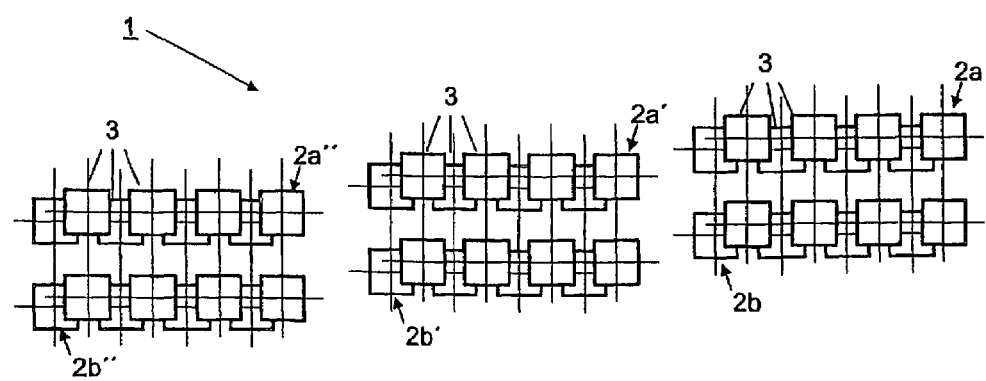

FIG. 5, in partial FIGS. 5A to 5D thereof, shows signal courses at various circuit points of the receiving device according to FIG. 4;

FIG. 6 shows yet another embodiment of the receiving device in a block diagram;

FIG. 7 shows the segmentation of the receiving zone in a schematic illustration similar to FIG. 1, by using two detector element arrays;

FIG. 7A shows a top view onto a common detector element for illustrating active areas and non-active areas in relationship to each other;

FIG. 8 shows an arrangement of 2×4 such detector elements for illustrating in particular the relatively large non-active areas between the active detector areas; and FIG. 9 schematically shows several groups of such IR detector elements, each in a matrix-like array, with an offset between the detector elements of the individual groups so as to ensure an imaging or projecting surface at the receiving device which is as free of interruptions as possible or even has zones of overlap.

In FIG. 1, part of an IR receiving device 1 is schematically illustrated which comprises a number of IR detector elements 3, here in rows and columns immediately adjacent each other, in a matrix-like arrangement 2. The detector element arrangement 2 has an associated imaging element 4, e.g. a convex lens, which is merely schematically shown, for optically imaging a communication zone 5. This communication zone 5 may, e.g., be a region of a toll road, a lane of a freeway subject to toll payment, or also a parking area subject to payment of parking fees, motor vehicles, such as the motor vehicle 6 schematically shown in FIG. 1, which are equipped with conventional communication devices, so-called OBUs, communicating with a stationary transmitting and receiving device which—apart from the receiving device 1—is not further illustrated in FIG. 1, yet which is sufficiently known in the prior art. In particular, the instant case is based on an IR communication, and FIG. 1 by way of example shows an IR beam 7 originating from the OBU in motor vehicle 6, which IR beam 7 produces an image 6' on the matrix arrangement 2 of the detector elements 3 via the imaging lens 4, which image corresponds to the position of the motor vehicle 6 in the communication zone 5. As regards imaging of the communication zone 5, the grate-shaped or matrix-type arrangement 2 of the detecting or receiving elements 3 corresponds to an analogous matrix-type or chessboard-type subdivision of this communication zone 5, thereby defining imaginary "tiles", e.g. 5.1, in the communication zone 5 to be observed, which tiles have corresponding rectangular receiving element surfaces, e.g. 5.1', in the detector element arrangement 2. Thus, there results a segmentation of the communication zone 5 in accordance with the segmentation of the detector surfaces or matrix-type detector element arrangement 2 of the receiving means 1, a beam 7 arriving from the communication zone 5 producing an image on an individual receiving element 3 or on a few adjacent receiving elements 3. Due to the fact that the transmitting objects, i.e. motor vehicles 6, move, this image, e.g. 6' in FIG. 1, migrates over the IR detector element arrangement 2, there always existing one receiving element 3 which receives a maximum radiation intensity and, thus, emits a maximum electric signal.

As mentioned before, in FIG. 1 an arrangement 2 of uninterrupted, consecutive active IR detector elements 3 is illustrated, which corresponds to an ideal segmentation with a single group of detector elements 3, yet such an ideal arrangement will not always be feasible, as will be explained in more detail hereinafter by way of FIGS. 7 to 9. In such a case, where non-active zones are present between the active surfaces of the IR detector elements 3, two or more groups or arrangements 2 are provided by IR detector elements, as will be explained in more detail further below.

Figure 2:
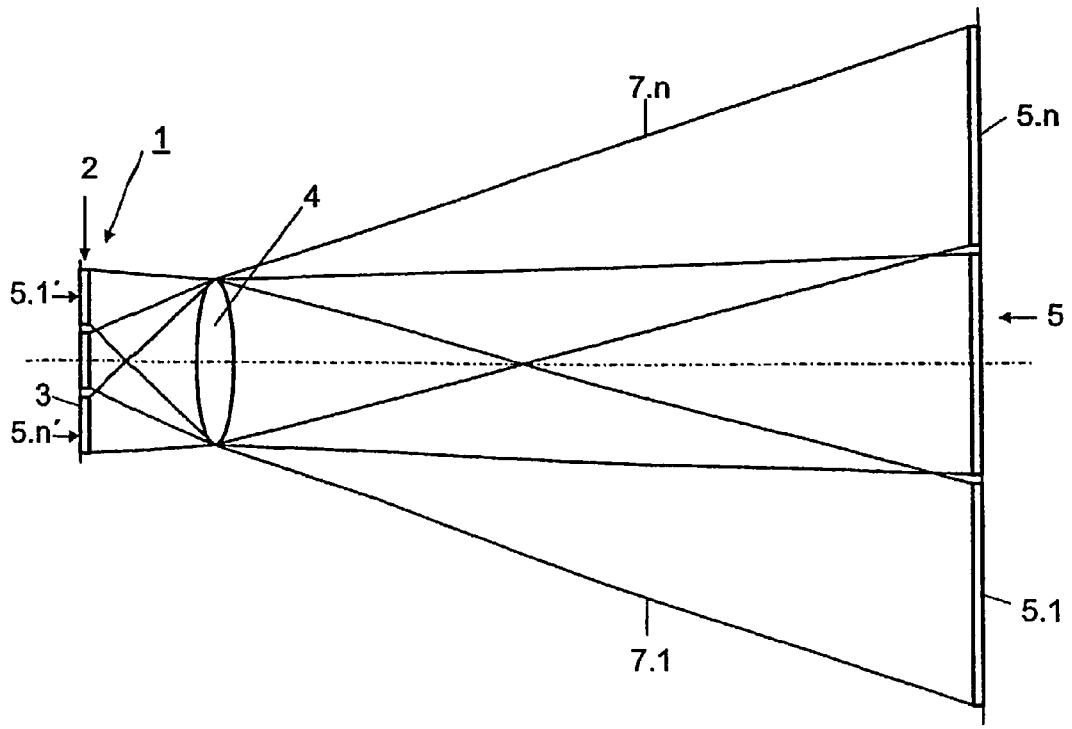
FIG. 2 shows the segmentation of the receiving device and of the communication zone in a schematic optical radiation course.

In FIG. 2, once more the association of a segmented communication zone 5 with its individual segments, e.g. 5.1 ... 5.n, to an IR detector element arrangement 2 is schematically illustrated in a view via an imaging object 4, in particular a convergent lens, an IR detector element 3 (or a number of such IR detector elements 3) forming the segment 5.1' ... 5.n' corresponding to the segment 5.1 etc. FIG. 2 also shows corresponding IR beams 7.1 or 7.n, respectively, (forming the imaging segment 5.n' of the communiction zone segment 5.n).

As mentioned before, the afore-described segmentation has the effect that always one IR detector element 3 will provide a maximum output signal at any given time, and this respective maximum output signal will be used for further signal processing, whereas the other output signals, i.e. the signals of the remaining IR detector elements, will be suppressed. Consequently, there will always be one optimum signal with a maximum SNR ratio, so that the sensitivity of the receiving device 1 is increased which, vice-versa, also means that an IR communication with comparable IR transmitting and receiving elements is rendered possible over substantially larger distances.

Figure 3:
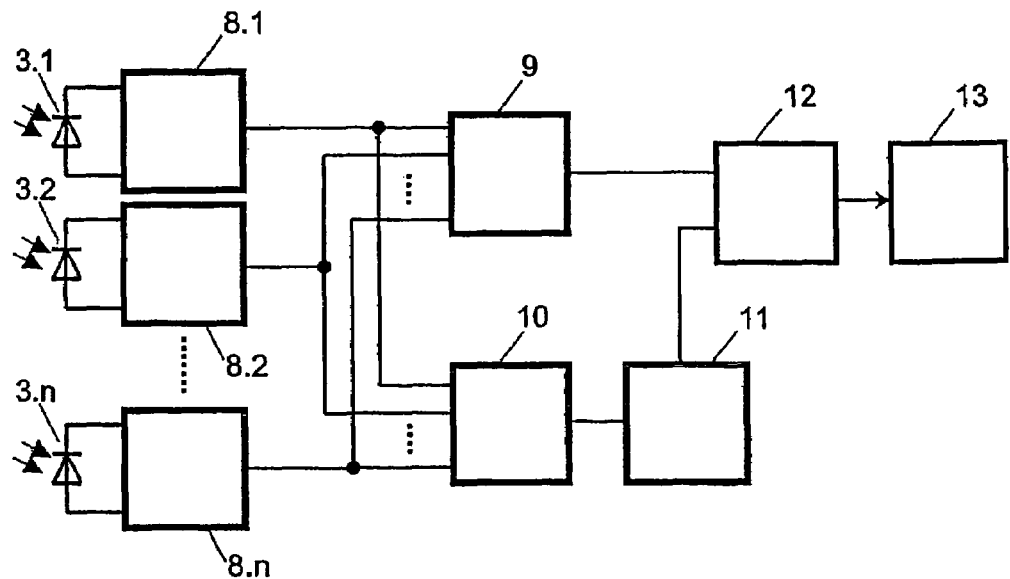
FIG. 3 shows a block diagram of an IR receiving device.

FIG. 3 now shows a processing circuit in a block diagram, with which the respective maximum output signal can be selected and supplied for an evaluation.

In detail, n IR detector elements 3.1, 3.2 ... 3.n, such as in the form of pin diodes or photo diodes, are illustrated, each of which having a separate consecutive amplifier 8.1, 8.2 ... 8.n. The outputs of these amplifiers 8.1, 8.2 ... 8.n are connected in parallel to inputs of a maximum detector 9, on the one hand, and of a peak detector 10, on the other hand. The peak detector 10 is followed by a threshold forming unit 11. The outputs of the threshold forming unit 11 as well as of the maximum detector 9 are connected to inputs of a comparator 12 which constitutes a pulse generating unit and only receives the respective maximum output pulse 9 that is applied by the maximum detector and whose amplitude (value-wise) is larger than the threshold value of the threshold forming unit 11, and which then responds by outputting a pulse signal to a further evaluating unit 13. The evaluating unit 13 can then decode the supplied pulse signals or data signals in a conventional manner, no further explanations being required in this respect.

FIG. 4 in more detail shows a processing circuit with selection of the respective maximum output signal of an IR detector element 3.1, 3.2 ... 3.(n-1), 3.n (as mentioned, e.g., of a photo diode or a pin diode); the respective IR detector elements 3.i are followed by amplifiers 8.1 ... (in general, 8.i), which in turn again each are followed by two diodes 14.1a, 14.1b, 14.2a, 14.2b ... 14.(n-1)a, 14.(n-1)b, 14.na, 14.nb (in general, 14.ia, 14.ib) connected in parallel, wherein, for instance, the anodes of these diodes 14.i each are connected to the output of the associated amplifier 8.i; however, the other sides of the diodes 14.i, i.e. the cathodes, e.g., are combined in groups to a mutual circuit point 15a or 15b, respectively, a maximum value circuit 9' being connected to the one circuit point 15b, and the peak circuit 10 and threshold forming unit 11 being connected to the other circuit point 15a. In detail, e.g. in the branch provided for threshold formation, there exists an RC unit 16 with a transversely arranged capacitor 17 and a longitudinal resistor 18, the resistor 18 at the same time being part of the voltage divider together with a further resistor 19. In the other signal path, there is, e.g., a resistor 20 which is provided for collecting the respective maximum signal, for supplying it to an input 21 of the comparator 12. To the other input 22 of the comparator 12, however, the voltage signal formed in the voltage divider 18, 19, i.e. the threshold value, is supplied.

In FIG. 5, in four lines or diagrams thereof, FIGS. 5A, 5B, 5C and 5D, individual voltage levels for voltages generally denoted by $U_E$, $U_1$, $U_2$ and $U_A$, are schematically shown. $U_E$ illustrates the voltage level of the individual IR detector elements 3.i after amplification in the respective associated amplifier 8.i, wherein in FIG. 5A in detail, voltage levels $S_1$, $S_2$ and $S_3$ are illustrated as output signals of these IR detector elements 3. These voltage levels $S_1$ to $S_3$ occur pulse-like at predetermined times, corresponding to the frequency of the IR signals as they are emitted by the OBU of a motor vehicle 6; due to the position and the movement of the emitting object (motor vehicles 6), the received levels change from pulse to pulse, i.e. the received levels $S_1$, $S_2$, $S_3$ can be different in amount from pulse to-pulse, as illustrated in FIG. 5A. At time $T_1$, e.g., the received level $S_1$ of the first IR detector element 3.1 will be the highest, at time $T_2$ the received level $S_2$ of the second detector element 3.2 will be the highest, and at time $T_3$ the received level $S_3$ of the third detector element 3.3 will be the highest.

In FIG. 5B, the voltage course of the peak value UP is shown as voltage $U_1$ at the capacitor 17 according to FIG. 4, the charge at the capacitor 17 increasing at each pulse time $T_1$, $T_2$, $T_3$ etc., and subsequently being reduced via the resistors 18, 19. At the voltage divider 18, 19, the threshold voltage $U_s$, reduced accordingly as compared to the peak value $U_p$, is obtained, which is applied to the input 22 of the comparator 12 and which is also shown in FIG. 5C.

In FIG. 5C, the voltage in the other signal path, i.e. the respectively occurring maximum voltage $U_{max}$ (i.e. at time $T_1$ signal $S_1$, at time $T_2$ signal $S_2$, and at time $T_3$ signal $S_3$) is shown as it lies at the resistor 20 and is supplied to the other input 21 of the comparator 12. As has been mentioned, for a better illustration also in FIG. 5C the threshold voltage $U_s$ has been indicated, and from this there immediately results the pulse course according to FIG. 5D, i.e. the output signal $U_{komp}$ of the comparator, which at the same time is the output signal $U_A$ of the described processing circuit according to FIG. 4, which then will be supplied to the evaluation unit 13 mentioned by way of FIG. 3.

In this manner, unambiguous digital pulse signals are obtained, with a large signal/noise ratio being achieved, since always the maximum detector element output signal (and only this) will be processed. Furthermore, it is also advantageous for the respective threshold level to be dynamically adapted to the received signal, whereby the noise can be even better suppressed. The output signals of the comparator 12 comprise uniform pulses, irrespective of the received level of the received signal.

FIG. 6 shows a generalisation of the processing circuit according to FIG. 4, it being visible that the output signals of the optic detector elements 3.i are connected in parallel to a maximum detector 9 after having been amplified in the associated amplifiers 8.i as signals S.i (concretely, S.1, S.2 . . . S.n), the output signal of the maximum detector 9 being supplied directly to an input of the comparator 12, on the one hand, and to a threshold forming unit 11, on the other hand; the threshold level obtained is supplied to the other input of the comparator 12 so as to obtain the digital signals according to FIG. 5D as previously described for evaluation thereof in an evaluating unit 13.

It has already been mentioned above that the IR detector elements 3 in most cases cannot be adjacently assembled without any interruption, as illustrated in FIG. 1, but that when they are directly set at each other in rows and columns, at least in one direction there will exist gaps between the active surfaces whereby dead zones result in the communication zone 5, i.e. zones which, when an IR signal (IR beam 7 in FIG. 1) is emitted from them, will not, or not adequately, be received at the receiving device 1 with the IR detector elements 3. This is shown in more detail in FIGS. 7, 7A and 8, FIG. 7, e.g., showing that two IR detector element arrays 2a and 2b are arranged one above the other (optionally also one beside the other) in which the detector elements 3.i are offset relative to the detector elements 3.i of the respective other array. By way of example, a gap between the active surfaces only in the horizontal direction is assumed here, and the detector elements 3.i are now distributed to the two arrays or groups 1a, 1b such that taken together, once more an uninterrupted imaging of the communication zone 5 will be achieved. When comparing FIG. 7 to FIG. 1, this can also be explained such that the uppermost first detector element 3.1 is provided in the upper array 2a, the next detector element 3.2 in the. uppermost row then will be in the lower array 2b of FIG. 7, the third detector element 3.3 again is provided in the upper array 2a, the fourth detector element 3.4 again in the lower array 2b etc. Thus, there results an offset arrangement of the detector elements 3.1, 3.3 etc., or 3.2, 3.4 etc., respectively, in the two arrays or groups 2a and 2b relative to each other, and if the two arrays 1a, 1b were to be shifted one over the other such that the surfaces of the detector elements 3 would lie in one plane, an "uninterrupted" arrangement of the detector elements 3, or even an overlap of the same, respectively, would once more be obtained. This thus corresponds to an uninterrupted imaging of all the zones or segments 5.i of the communication zone 5 on the receiving device 1. For this imaging, again convex imaging lenses 4a and 4b are, e.g., provided so as to focus the "partial beams" 7a, 7b impinging on them, as they result from the IR beam emitted by the OBU of the motor vehicle 6, on the respective associated detector element array 2a or 2b, respectively. As can be seen from FIG. 7, an image 6a, e.g., is obtained on a central detector element 3.i at the upper array 2a, whereas the corresponding image 6b in the lower array 2b falls into the space between the detector elements 3.(i−1) and 3.(i+1) "offset" relative thereto. The image 6a forming in the upper array 1a on the detector element 3.i leads to the detected maximum output signal.

FIG. 7A in top view shows how an IR detector element 3 may be designed in practice, and how the nonactive regions come about. The IR detector element 3 has an approximately square active receiving surface 31 on a substrate 32, and on two oppositely arranged longitudinal edges there are solder pads 33 and 34, respectively, which are the anode and the cathode, respectively, of the photo diode forming the IR detector element 3. When such photo diodes or detector elements 3, respectively, are arranged like a matrix, as according to the array 2' in FIG. 8, this will result in inactive zones 35, 36 obtained between the active surfaces 31 of adjacent receiving and detecting elements 3, both in the direction of the rows and in the direction of columns, which accordingly will lead to dead zones present in the observed communication zone 5 (cf. FIG. 1).

To counteract this, several arrays 2a, 2b, as basically illustrated in FIG. 7, are arranged one below the other or one beside the other so as to be able to completely image the communication zone 5, i.e. image it without any dead zones.

It should be mentioned that the detector element arrays 2a, 2b in sum each have relatively small dimensions and, thus, also if several arrays 2a, 2b . . . are arranged above each other and beside each other, the IR light cone emitted by the respective emitting object, in particular the OBU of a motor vehicle 6, will already be sufficiently widely spread at the impinging surface of the receiving device 1 (e.g. to a diameter of half a meter or one meter) so that several such detector element arrangements 2a, 2b will be hit by one and the same IR light cone.

In FIG. 9, 3×2 such arrays of detector elements 3 are schematically illustrated, two arrays 2a, 2b each being shown already (theoretically) interleaved similar to those of FIG. 7, and in sum, thus, detector element arrays 2a, 2a' and 2a" (with 2×4 detector elements 3 each) as well as furthermore detector element arrays 2b, 2b', 2b" "arranged therebelow" finally must be imagined interleaved or superimposed such that, taken together, a uniform surface of detector elements 3 will be obtained; in this manner, the transmitting object (motor vehicle 6) will always be imaged with a maximum radiation intensity and, accordingly, with a maximum output signal on one of the detector elements 3 of the arrays 2a to 2b".

The invention claimed is:

1. An infrared (IR) receiving device comprising IR detector elements (3) for receiving IR signals from a communication zone (5), as well as a processing circuit for deriving electric signals corresponding to the IR signals received, wherein the IR detector elements (3) are provided in at least one matrix-type arrangement (2) which corresponds to a matrix-type segmentation of the communication zone (5), and the processing circuit comprises a maximum detector circuit (9) connected to the IR detector elements (3), which maximum detector circuit (9) selects one respective maximum output signal from among the output signals of the IR detector elements (3) for deriving the electric signal, wherein a threshold-value-forming unit (11) is connected to the IR detector elements (3) whose output is connected to the input (22) of a comparator (12) at whose other input (21) the respective maximum IR detector element output signal is applied, and wherein each IR detector element (3.i) for selecting the maximum output signal has at least one consecutive diode (14.ia, 14.ib), the diodes being interconnected by their sides facing away from the IR detector elements (3.I).

2. A receiving device according to claim 1, wherein at least two matrix-type IR detector element arrangements (2a, 2b) are provided, the positions of the IR detector elements (3) being offset relative to each other from array to array.

3. A receiving device according to claim 1, wherein the IR detector elements (3) are provided in a chessboard-type arrangement, with their active detector surfaces being substantially consecutively arranged, without gaps.

4. A receiving device according to claim 1, wherein a common imaging lens (4) is arranged in front of the or each IR detector element arrangement (2).

5. A receiving device according to claim 1, wherein the diodes, or the diodes (14.ia) of another group, respectively, are connected to the threshold-value-forming unit (11).

6. A receiving device according to claim 1, wherein the threshold-value-forming unit (11) has a voltage divider (18, 19) from which the threshold voltage is supplied to the one input (22) of the comparator (12).

7. A receiving device according to claim 1, wherein the diodes (14.$ia$, 14.$ib$) are interconnected in groups.

8. A receiving device according to claim 1, wherein the diodes (14.$ia$, 14.$ib$) are interconnected by their cathodes.

9. An infrared (IR) receiving device comprising IR detector elements (3) for receiving IR signals from a communication zone (5), as well as a processing circuit for deriving electric signals corresponding to the IR signals received, wherein the IR detector elements (3) are provided in at least one matrix-type arrangement (2) which corresponds to a matrix-type segmentation of the communication zone (5), and the processing circuit comprises a maximum detector circuit (9) connected to the IR detector elements (3), which maximum detector circuit (9) selects one respective maximum output signal from among the output signals of the IR detector elements (3) for deriving the electric signal, wherein a threshold-value-forming unit (11) is connected to the IR detector elements (3) whose output is connected to the input (22) of a comparator (12) at whose other input (21) the respective maximum IR detector element output signal is applied, wherein each IR detector element (3.$i$) for selecting the maximum output signal has at least one consecutive diode (14.$ia$, 14.$ib$), the diodes being interconnected by their sides facing away from the IR detector elements (3.I), and wherein the diodes, or the diodes (14.$ib$) of one group, respectively, are connected to a common resistor (20) from which the respective maximum IR detector element output signal can be taken and supplied to the other input (21) of the comparator (12).

10. An infrared (IR) receiving device comprising IR detector elements (3) for receiving IR signals from a communication zone (5), as well as a processing circuit for deriving electric signals corresponding to the IR signals received, wherein the IR detector elements (3) are provided in at least one matrix-type arrangement (2) which corresponds to a matrix-type segmentation of the communication zone (5), and the processing circuit comprises a maximum detector circuit (9) connected to the IR detector elements (3), which maximum detector circuit (9) selects one respective maximum output signal from among the output signals of the IR detector elements (3) for deriving the electric signal, wherein a threshold-value-forming unit (11) is connected to the IR detector elements (3) whose output is connected to the input (22) of a comparator (12) at whose other input (21) the respective maximum IR detector element output signal is applied, wherein each IR detector element (3.$i$) for selecting the maximum output signal has at least one consecutive diode (14.$ia$, 14.$ib$), the diodes being interconnected by their sides facing away from the IR detector elements (3.I), and wherein the threshold-value-forming unit (11) is formed by an RC unit (16).

* * * * *